G. W. Rogers,
Ash Sifter.

No. 113,349.   Patented Apr. 4, 1871.

Witnesses:
A. W. Almquist
Wm. H. E. Smith

Inventor:
G. W. Rogers
per Munn & Co.
Attorneys.

United States Patent Office.

GEORGE W. ROGERS, OF NEW YORK, N. Y.

Letters Patent No. 113,349, dated April 4, 1871.

IMPROVEMENT IN ASH-SIFTERS.

The Schedule referred to in these Letters Patent and making part of the same.

*To all whom it may concern:*

Be it known that I, GEORGE W. ROGERS, of the city of New York, in the county and State of New York, have invented a new and improved Ash-Sifter; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
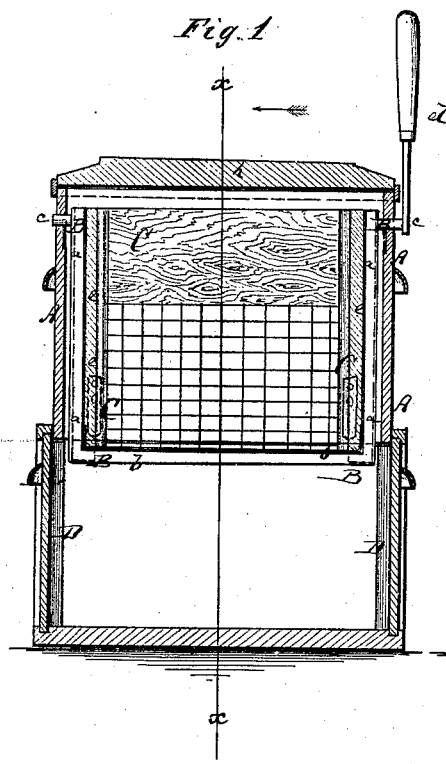
Figure 1 represents a vertical longitudinal section of my improved ash-sifter.

In my invention I bring together for the first time several things well known to the public, but never before combined to bring about a useful result; and It consists in the combination of the several parts, as hereinafter described, to form an improved ash-sifter.

A in the drawing represents a box, made of wood or other material, of suitable size, and preferably of about cubic form.

Across the top of the box A extends a shaft, B, which hangs in the sides of the box.

Within the box this shaft is made U-shaped—that is to say, bent down, as at $a\ a$, along the inner sides, and connecting the lower ends of the upright parts $a$ by a horizontal cross-piece, $b$. The lower piece $b$ is nearly or about in line with the bottom of the box A.

Figure 2:
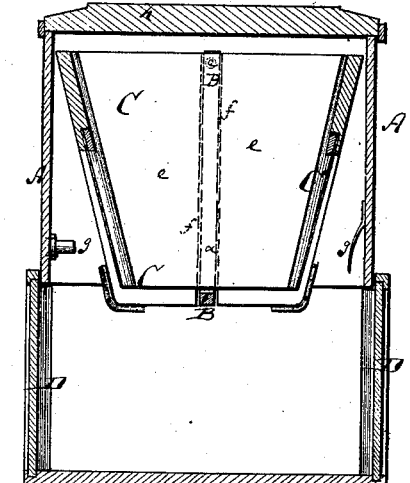
Figure 2 is a transverse section of the same taken on the plane of the line $x\ x$, fig. 1.
Figure 3:
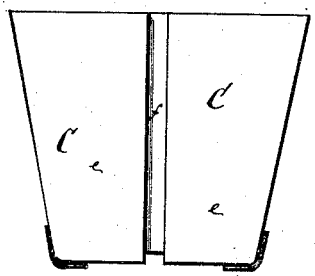
Figure 3 is a detail side view of the oscillating sieve.

The shaft B has thus only two short axes or pieces, $c\ c$, on which it turns, and is provided with a handle, $d$, on one end, to receive oscillating motion thereby. The shaft B serves as a support for the sieve C. This sieve is made with straight sides, $e\ e$, each of which has a straight groove, $f$, in the middle, as shown in fig. 3. The sieve is placed upon the shaft so that the upright parts of the latter fit into the grooves $f$, as indicated in figs. 1 and 2. The sieve is thereby held firmly to the shaft, and can be rocked with the same. The bottom of the sieve is perforated, as may also be the ends of the same, if desired.

$g\ g$ are springs or rubber cushions, affixed within the box A, opposite the ends of the sieve. As the shaft is being oscillated it will also oscillate the sieve and cause the same to shake out the ashes into a box or vessel, D, upon which the box A is placed. The springs or cushions $g\ g$ serve to gently arrest the sieve after each stroke, and to give it a shock to cause a rapid separation of the ashes.

During the operation the box A is closed by a cover, $h$. The sieve can at all times be withdrawn from the shaft B when it is to be emptied or cleaned.

Having thus described my invention,

I claim as new and desire to secure by Letters Patent—

The box A, having springs $g\ g$ on its inner sides, the rock-shaft B, composed of parts $a\ a\ b\ b\ c\ c$, and the sieve C, grooved in the middle thereof at $f\ f$, all combined as described to form an improved ash-sifter.

GEO. W. ROGERS.

Witnesses:
GEO. W. MABEE,
T. B. MOSHER.